United States Patent
Wu (10) Patent No.: US 11,379,803 B2
(45) Date of Patent: Jul. 5, 2022

(54) BLOCKCHAIN-BASED DATA PROCESSING METHOD AND DEVICE

(71) Applicant: Advanced New Technologies Co., Ltd., Grand Cayman (KY)

(72) Inventor: Hao Wu, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/560,520

(22) Filed: Sep. 4, 2019

(65) Prior Publication Data

US 2020/0005255 A1 Jan. 2, 2020

Related U.S. Application Data

(63) Continuation of application No. PCT/CN2018/087766, filed on May 22, 2018.

(30) Foreign Application Priority Data

May 23, 2017 (CN) .......................... 201710366698.2

(51) Int. Cl.
*G06Q 20/06* (2012.01)
*G06Q 20/36* (2012.01)
*H04L 9/06* (2006.01)

(52) U.S. Cl.
CPC ..... *G06Q 20/0658* (2013.01); *G06Q 20/3674* (2013.01); *H04L 9/0637* (2013.01)

(58) Field of Classification Search
None
See application file for complete search history.

(56) References Cited

U.S. PATENT DOCUMENTS 9,405,920 B1 * 8/2016 Roth ..................... G06F 21/602
9,519,696 B1 12/2016 Roth et al.
(Continued)

FOREIGN PATENT DOCUMENTS

| CN | 105243117 | 1/2016 |
| CN | 105956923 | 9/2016 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Neha Patel
*Assistant Examiner* — Nicholas K Phan
(74) *Attorney, Agent, or Firm* — Fish & Richardson P.C.

(57) ABSTRACT

A blockchain node receives transaction data and formatted information corresponding to the transaction data. The blockchain node determines, based on a transaction type corresponding to the transaction data and a predetermined relationship between the transaction type and a processing policy, a processing policy corresponding to the transaction data, where the processing policy includes a data attribute used for conversion and a conversion rule corresponding to the data attribute. The blockchain node converts the formatted information into an attribute value based on the conversion rule. A data attribute corresponding to the attribute value is determined. The blockchain node verifies received transaction data based on the attribute value of the data attribute and the attribute value of the data attribute.

21 Claims, 4 Drawing Sheets

(56) References Cited

U.S. PATENT DOCUMENTS

| | | | |
|---|---|---|---|
| 9,635,000 | B1 | 4/2017 | Muftic |
| 2004/0025030 | A1 | 2/2004 | Corbett-Clark et al. |
| 2010/0223186 | A1* | 9/2010 | Hogan .................. G07F 7/08 705/71 |
| 2015/0324789 | A1 | 11/2015 | Dvorak et al. |
| 2015/0358164 | A1* | 12/2015 | Carter .................. G09C 5/00 713/179 |
| 2016/0342976 | A1 | 11/2016 | Davis |
| 2016/0342978 | A1 | 11/2016 | Davis et al. |
| 2017/0132626 | A1 | 5/2017 | Kennedy |
| 2017/0180134 | A1* | 6/2017 | King .................. H04L 63/0823 |
| 2018/0131706 | A1* | 5/2018 | Anderson .............. H04L 9/3236 |
| 2018/0167217 | A1* | 6/2018 | Brady .................. H04L 67/34 |
| 2019/0238550 | A1* | 8/2019 | Zhang .................. H04L 9/0637 |
| 2019/0280855 | A1* | 9/2019 | Tong .................. H04L 9/3297 |
| 2019/0310878 | A1* | 10/2019 | Qiu .................. G06F 9/466 |

FOREIGN PATENT DOCUMENTS

| | | |
|---|---|---|
| CN | 106251144 | 12/2016 |
| CN | 106506493 | 3/2017 |
| CN | 106682984 | 5/2017 |
| CN | 107451175 | 12/2017 |
| JP | 2003177948 | 6/2003 |
| JP | 2013233995 | 11/2013 |
| JP | 2017004139 | 1/2017 |
| WO | WO 9946701 | 9/1999 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2018/087766, dated Aug. 6, 2018, 9 pages (with partial English translation).
Extended European Search Report in European Application No. 18805645.1, dated Nov. 25, 2019, 6 pages.
PCT International Preliminary Report on Patentability in International Application No. PCT/CN2018/087766, dated Nov. 26, 2019, 11 pages (with English translation).
Extended European Search Report in European Application No. 21184024.4, dated Oct. 1, 2021, 5 pages.

* cited by examiner

BLOCKCHAIN-BASED DATA PROCESSING
METHOD AND DEVICE

CROSS-REFERENCE TO RELATED
APPLICATIONS

This application is a continuation of PCT Application No. PCT/CN2018/087766, filed on May 22, 2018, which claims priority to Chinese Patent Application No. 201710366698.2, filed on May 23, 2017, and each application is hereby incorporated by reference in its entirety.

TECHNICAL FIELD

The present application relates to the field of Internet information processing technologies and the field of blockchain technologies, and in particular, to a blockchain-based data processing method and device.

BACKGROUND

The blockchain technology is also referred to as a distributed ledger technology. As a distributed Internet database technology, the blockchain technology is characterized by decentralization, transparency, tamper-resistance, and trustiness. A network constructed based on the blockchain technology may be referred to as a blockchain network, and the blockchain network includes network nodes (which may be also referred to as blockchain nodes).

When receiving transaction data, the blockchain node determines a digest of the transaction data and encrypts the digest by using a predetermined algorithm, to obtain a digital signature of the transaction data. Then, the blockchain node sends the transaction data and the digital signature of the transaction data to another blockchain node through broadcast. In a consensus phase, another blockchain node decrypts the received digital signature to obtain the transaction data corresponding to the received digital signature, and further determines whether the transaction data is consistent with the received transaction data, to implement consensus processing of the transaction data.

However, in practice, an object of encryption calculation is serialized information. That is, when determining the digest of the transaction data, the blockchain node needs to convert the received transaction data into serialized data, to obtain the digest of the transaction data based on the serialized data.

However, the blockchain node in the blockchain network supports different operating systems and different compilation languages. Therefore, for the same piece of transaction data, because of different operating systems and/or compilation languages, a digest obtained in a process in which the blockchain node sends the transaction data and encrypts the transaction data may be different from a digest obtained in a process in which the blockchain node receives the transaction data and decrypts a received digital signature. As such, a consensus failure possibility of the transaction data is increased, and transaction data processing efficiency is reduced.

SUMMARY

In view of this, implementations of the present application provide a blockchain-based data processing method and device, to alleviate a problem of low transaction data processing efficiency in the existing technology.

The following technical solutions are used in the implementations of the present application.

An implementation of the present application provides a blockchain-based data processing method, including: determining, by a blockchain node and for obtained transaction data, a transaction type corresponding to the transaction data; determining, by the blockchain node and based on a predetermined relationship between the transaction type and a processing policy, a processing policy corresponding to the transaction data, where the processing policy includes a data attribute used for conversion and a conversion rule corresponding to the data attribute; extracting, by the blockchain node and from the transaction data, an attribute value corresponding to the data attribute included in the processing policy, and converting the extracted attribute value into formatted information by using the conversion rule included in the processing policy; and processing, by the blockchain node, the transaction data based on the formatted information.

An implementation of the present application further provides a blockchain-based data processing method, including: receiving, by a blockchain node, transaction data and formatted information corresponding to the transaction data; determining, by the blockchain node and based on a transaction type corresponding to the transaction data and a predetermined relationship between the transaction type and a processing policy, a processing policy corresponding to the transaction data, where the processing policy includes a data attribute used for conversion and a conversion rule corresponding to the data attribute; converting, by the blockchain node, the formatted information into an attribute value based on the conversion rule included in the processing policy, and determining a data attribute corresponding to the attribute value; and verifying, by the blockchain node, received transaction data based on the attribute value of the data attribute and the attribute value of the data attribute included in the transaction data.

An implementation of the present application further provides a blockchain-based data processing device, including: a determining unit, configured to determine, for obtained transaction data, a transaction type corresponding to the transaction data; and a processing unit, configured to: determine, based on a predetermined relationship between the transaction type and a processing policy, a processing policy corresponding to the transaction data, where the processing policy includes a data attribute used for conversion and a conversion rule corresponding to the data attribute; and extract, from the transaction data, an attribute value corresponding to the data attribute included in the processing policy, and convert the extracted attribute value into formatted information by using the conversion rule included in the processing policy; and process the transaction data based on the formatted information.

An implementation of the present application further provides a blockchain-based data processing device, including: a receiving unit, configured to receive transaction data and formatted information corresponding to the transaction data; a determining unit, configured to determine, based on a transaction type corresponding to the transaction data and a predetermined relationship between the transaction type and a processing policy, a processing policy corresponding to the transaction data, where the processing policy includes a data attribute used for conversion and a conversion rule corresponding to the data attribute; a processing unit, configured to convert the formatted information into an attribute value based on the conversion rule included in the processing policy, and determine a data attribute corresponding to the attribute value; and verify received transaction data based on the attribute value of the data attribute and the attribute value of the data attribute included in the transaction data.

At least one of the previously described technical solutions used in the implementations of the present application can achieve the following beneficial effects:

In the implementations of the present application, the predetermined relationship between a transaction type and a processing policy is configured, and the processing policy includes the data attribute used for conversion and the conversion rule corresponding to the data attribute. The blockchain node determines, for the obtained transaction data, the transaction type corresponding to the transaction data; determines, based on the predetermined relationship, the processing policy corresponding to the transaction data; extracts, from the transaction data, an attribute value of the data attribute included in the processing policy, and converts the extracted attribute value of the data attribute into formatted information based on the conversion rule included in the processing policy; and performs consensus processing on the transaction data based on the formatted information. As such, a unified conversion method can bring the following advantages: Different blockchain nodes can accurately restore converted information to original data, a difference between a digest obtained by a sender in an encryption process and a digest obtained by a receiver in a decryption process that is caused because of different operation platforms and/or compilation languages can be effectively avoided, consensus efficiency of the transaction data is effectively improved, and processing efficiency of the transaction data is improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. Description of the accompanying drawings is as follows.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Figure 1:
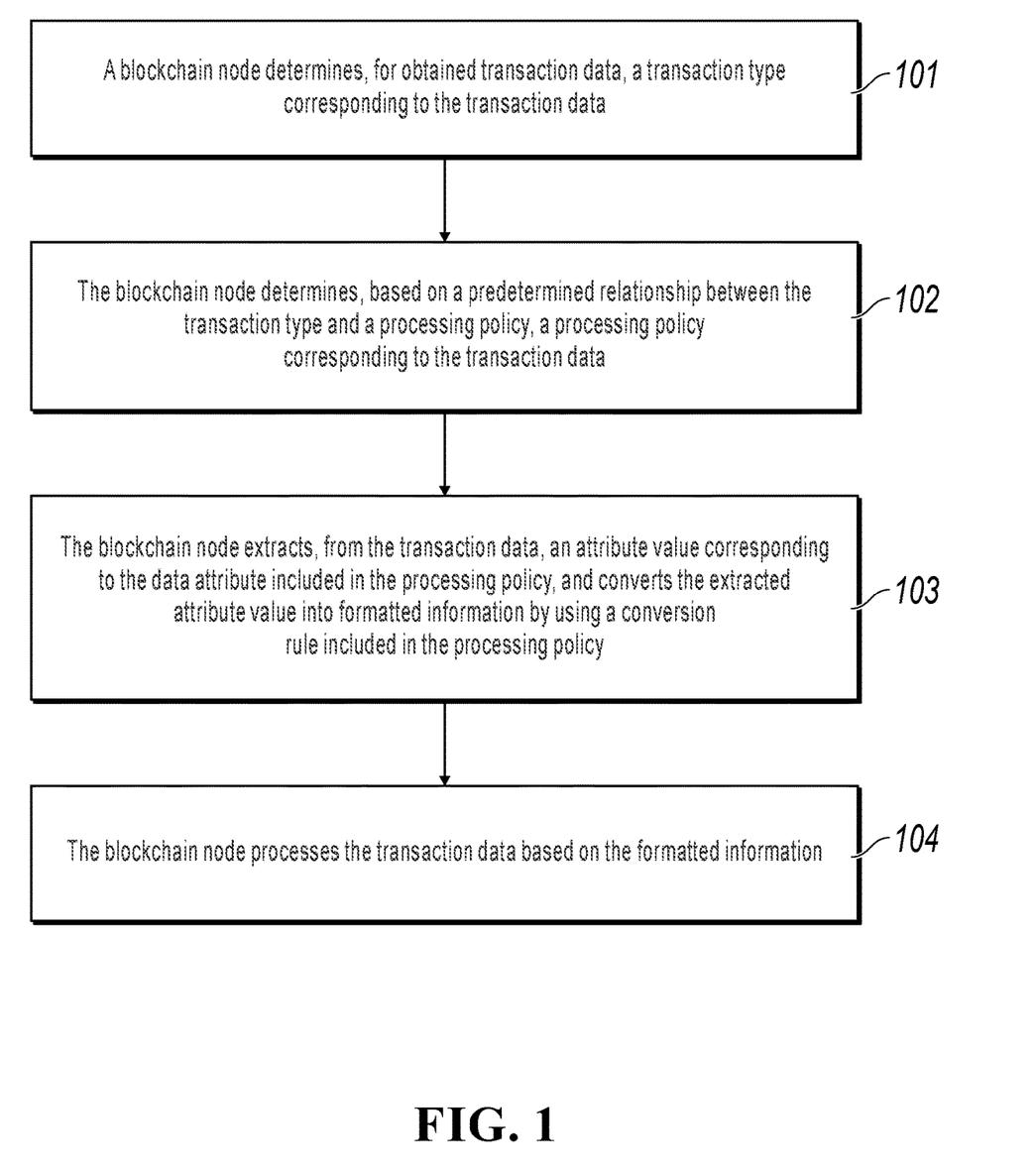
FIG. 1 is a schematic flowchart illustrating a blockchain-based data processing method, according to an implementation of the present application.

FIG. 1 is a schematic flowchart illustrating a blockchain-based data processing method, according to an implementation of the present application. The method can be described as follows. An execution entity of the present implementation of the present application includes but is not limited to a blockchain node.

It is worthwhile to note that usually three processing phases need to be performed on the transaction data in a blockchain network: processing, consensus, and storage. When processing the service data, the blockchain node processes the service data. Usually, after the service data is processed, a digital signature of the service data is obtained. As such, when receiving service data broadcast by the blockchain node that processes the service data, a blockchain node that does not process the service data performs signature verification (the signature verification means that, when receiving service data and a digital signature sent by a sender, a receiver verifies the received digital signature by using a public key, and determines, through a verification operation, that the received service data is sent by the sender), to verify whether the received service data is tampered with in a network transmission process.

In a process of obtaining the digital signature of the service data, first, the service data needs to be serialized. Serialization means that the service data is converted into a string (for example, the string may be expressed in a binary form), and the string can be converted into the service data through deserialization. Next, the digital signature corresponding to the service data is obtained by calculating a serialization result.

However, the blockchain network includes a plurality of blockchain nodes. Different blockchain nodes can support different operating systems and different compilation languages. To be specific, for the same piece of transaction data, serialization results that are obtained by serializing the transaction data may be different because of different operating systems and/or compilation languages. For example, the blockchain node that processes the service data and the blockchain node that does not process the service data support different operating systems, the blockchain node that processes the service data performs serialization processing on the service data in the previous method, and obtains the digital signature of the service data. Then the blockchain node that processes the service data sends the service data and the digital signature to the blockchain node that does not process the service data. Because the blockchain node that processes the service data and the blockchain node that does not process the service data support different operating systems, a serialization result that is obtained by restoring a digital signature by the blockchain node that does not process the service data is different from a serialization result that is obtained by serializing the service data in the previous method by the blockchain node that processes the service data, and further, it is determined that the obtained service data is different from the received service data, thereby affecting subsequent processing of the service data. Therefore, a technical solution of the present application is provided and a unified conversion method is used to bring the following advantages: Different blockchain nodes can accurately restore converted information to original data, a difference between a digest obtained by a sender in an encryption process and a digest obtained by a receiver in a decryption process that is caused because of different operation platforms and/or compilation languages can be effectively avoided, consensus efficiency of the transaction data is effectively improved, and processing efficiency of the transaction data is improved.

Step 101: A blockchain node determines, for obtained transaction data, a transaction type corresponding to the transaction data.

In the present implementation of the present application, the blockchain node can serve as a node that processes the transaction data, and receive transaction data from an external device or an application client device. When receiving the transaction data, the blockchain node can determine, based on a service in which the transaction data is generated, a transaction type corresponding to the transaction data, where the transaction type may be understood as a service type. The blockchain node can alternatively serve as a node that does not process the transaction data, and further obtain, through broadcast, the transaction data from the node that processes the transaction data. Similarly, when receiving the transaction data, the blockchain node can determine, based on the service in which the transaction data is generated, a transaction type corresponding to the transaction data, where the transaction type may be understood as the service type.

Step 102: The blockchain node determines, based on a predetermined relationship between the transaction type and a processing policy, a processing policy corresponding to the transaction data.

The processing policy includes a data attribute used for conversion and a conversion rule corresponding to the data attribute. The conversion rule here may be understood as a rule for converting the transaction data into formatted information.

In the present implementation of the present application, a predetermined relationship between a transaction type and a processing policy may be preconfigured in each blockchain node in the blockchain network, so that a unified processing policy is used for the received transaction data. The unified processing policy described here can indicate not only the same processing policy, but also different processing policies based on different transaction types. However, a sender and a receiver that deal with the transaction data can use the same processing policy to perform processing. Therefore, the difference between the digest obtained by the sender in the encryption process and the digest obtained by the receiver in the decryption process that is caused because of different operation platforms and/or compilation languages can be avoided by using the unified processing policy.

The processing policy described in the present implementation of the present application includes but is not limited to the following content:

1. a to-be-converted data attribute, where the to-be-converted data attribute is determined for each transaction type; and 2. a conversion rule, where unique formatted information corresponding to the to-be-converted data attribute can be determined by using the conversion rule, and the formatted information here may also be referred to as serialized data.

In addition, the processing policy may include a sorting sequence of data attributes. That is, after formatted information of attribute values corresponding to different data attributes of the service data is obtained, it is determined that the formatted information is sorted based on the sorting sequence of the data attributes, and a sorting result may be considered as the formatted information of the service data. For example, for data attribute 1, data attribute 2, and data attribute 3 included in the service data, a sorting sequence included in the processing policy may be 123, 321, 231, or 213. Here, different sorting sequences of the data attributes indicate that different formatted information of the service data is to be obtained, and subsequent processing results can be different (for example, digests obtained through calculation can be different).

The following describes how to determine the predetermined relationship between a transaction type and a processing policy.

The following operations are performed for each transaction type: determining a transaction feature of the transaction type; selecting, from the transaction data of the transaction type, at least one data attribute that can represent the transaction feature, where for different transaction types, data attributes used to represent transaction features corresponding to the transaction types are also different, and the data attributes here include but are not limited to a hash value, a public key, a timestamp, transaction content, etc.; and generating, based on the selected at least one data attribute and a conversion rule configured for the data attribute, a processing policy corresponding to the transaction type, and establishing a mapping relationship between the transaction type and the processing policy.

It is worthwhile to note that, for different transaction types, a conversion rule is configured for each transaction type. The conversion rule here may be applicable to different data attributes included in the transaction data of the transaction type. Different conversion rules may alternatively be configured for different data attributes included in the transaction data of the transaction type. Implementations are not specifically limited in the present application.

In the present implementation of the present application, after determining the transaction type of the transaction data, the blockchain node may determine, based on the existing predetermined relationship between a transaction type and a processing policy, the processing policy corresponding to the transaction data.

Step 103: The blockchain node extracts, from the transaction data, an attribute value corresponding to the data attribute included in the processing policy, and converts the extracted attribute value into formatted information by using the conversion rule included in the processing policy.

In the present implementation of the present application, first, the blockchain node extracts, from the obtained transaction data and based on the data attribute used for conversion that is included in the processing policy, the attribute value corresponding to the data attribute.

Assuming that one data attribute is included in the processing policy, the attribute value corresponding to the data attribute is extracted from the obtained transaction data.

Assuming that a plurality of data attributes are included in the processing policy, attribute values corresponding to the data attributes are sequentially extracted from the obtained transaction data.

Next, the blockchain node converts the extracted attribute value into the formatted information by using the conversion rule included in the processing policy.

Specifically, the blockchain node performs an operation on the extracted attribute value based on a conversion algorithm included in the processing policy, to obtain a string corresponding to the attribute value.

For example, the extracted attribute value of the data attribute is converted into binary data. Assuming that the extracted data attribute is a hash value, a value corresponding to the hash value is converted into the binary data.

It is worthwhile to note that, assuming that a plurality of data attributes are included in the processing policy, each time an attribute value corresponding to one data attribute is extracted, the attribute value may be converted. Alternatively, attribute values of the data attributes that need to be converted may be extracted at a time, and attribute values corresponding to different data attributes are separately converted. A processing sequence is not limited here.

Preferably, in the present implementation of the present application, before the blockchain node performs consensus processing on the transaction data based on the formatted information, the method further includes: in response to determining that more than one data attribute is included in the processing policy, after obtaining formatted information corresponding to each extracted attribute value, sorting, by the blockchain node, the obtained formatted information based on a sorting rule of the data attribute included in the processing policy.

Assuming that the data attributes included in the processing policy are data attribute 1, data attribute 3, and data attribute 5, if obtained formatted information corresponding to an attribute value of data attribute 1 is 1000, obtained formatted information corresponding to an attribute value of data attribute 3 is 1001, and obtained formatted information corresponding to an attribute value of data attribute 5 is 1101. For example, a sorting rule of the included data attributes is 153, a formatted information sequence obtained through sorting based on the sorting rule of the data attributes included in the processing policy is 100011011001; and for another example, if the sorting rule of the included data attributes is 531, a formatted information sequence obtained through sorting based on the sorting rule of the data attributes included in the processing policy is 110110011000.

Step 104: The blockchain node processes the transaction data based on the formatted information.

In the present implementation of the present application, after obtaining the formatted information, the blockchain node needs to determine whether the transaction data needs to be encrypted. If the transaction data does not need to be encrypted, the blockchain node broadcasts the formatted information and the transaction data, so that another blockchain node in the blockchain network performs consensus processing on the transaction data based on the formatted information; or if the transaction data needs to be encrypted, the blockchain node encrypts the formatted information to obtain an encryption result, and sends the encryption result and the transaction data to another blockchain node in the blockchain network, to perform consensus processing on the transaction data.

Based on the technical solutions provided in the present implementation of the present application, the predetermined relationship between a transaction type and a processing policy is configured, and the processing policy includes the data attribute used for conversion and the conversion rule corresponding to the data attribute. The blockchain node determines, for the obtained transaction data, the transaction type corresponding to the transaction data; determines, based on the predetermined relationship, the processing policy corresponding to the transaction data; extracts, from the transaction data, an attribute value of the data attribute included in the processing policy, and converts the extracted attribute value of the data attribute into formatted information based on the conversion rule included in the processing policy; and performs consensus processing on the transaction data based on the formatted information. As such, a unified conversion method is used to bring the following advantages: Different blockchain nodes can accurately restore converted information to original data, a difference between a digest obtained by a sender in an encryption process and a digest obtained by a receiver in a decryption process that is caused because of different operation platforms and/or compilation languages can be effectively avoided, consensus efficiency of the transaction data is effectively improved, and processing efficiency of the transaction data is improved.

Figure 2:
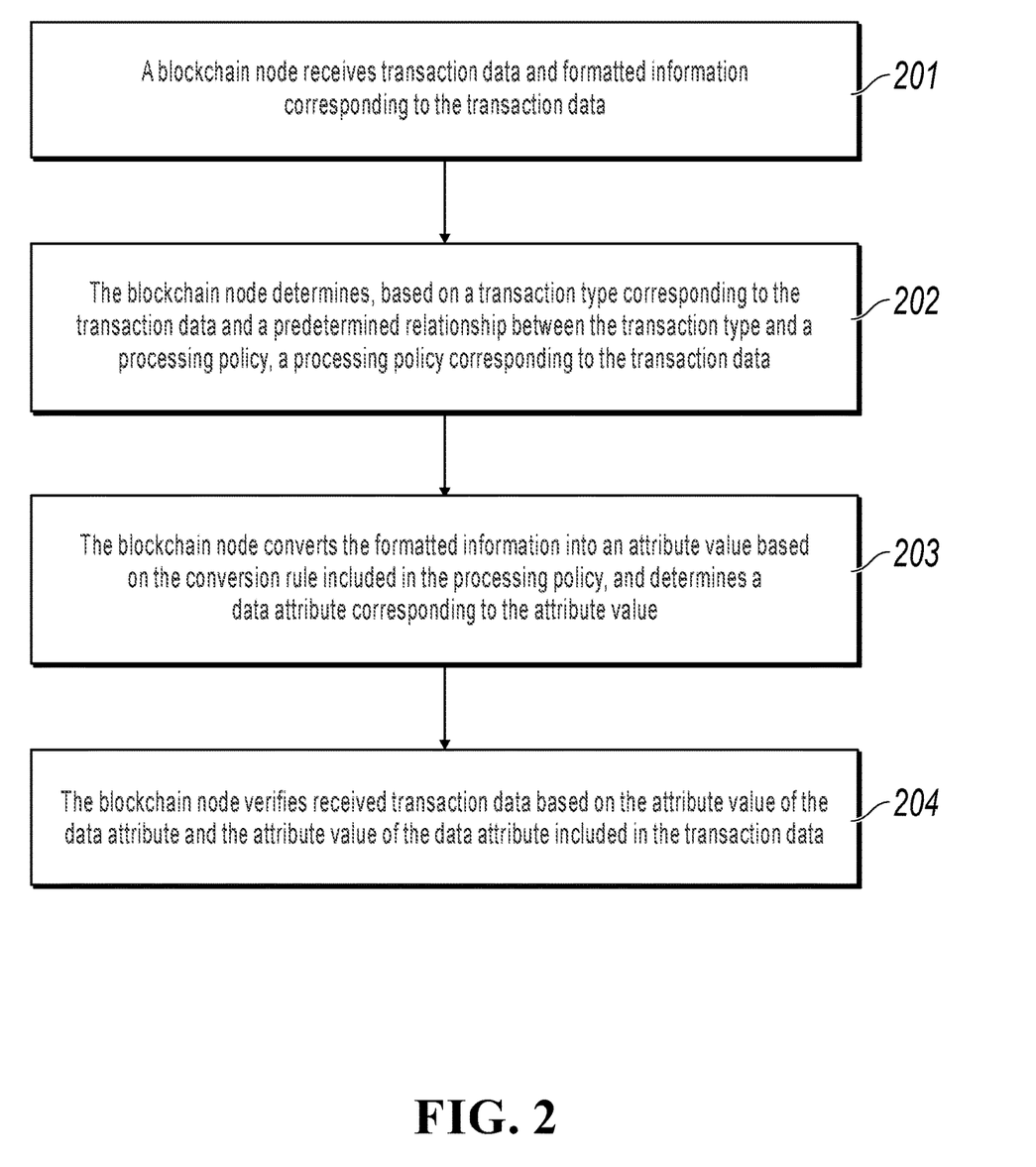
FIG. 2 is a schematic flowchart illustrating a blockchain-based data processing method, according to an implementation of the present application.

FIG. 2 is a schematic flowchart illustrating a blockchain-based data processing method, according to an implementation of the present application. The method can be described as follows. The present implementation of the present application is executed by a node in a blockchain network that does not process service data.

Step 201: A blockchain node receives transaction data and formatted information corresponding to the transaction data.

In the present implementation of the present application, as the node that does not process the service data, the blockchain node receives, through broadcast, a packet broadcast by the node that processes the service data, where the packet includes transaction data and formatted information corresponding to the transaction data.

The formatted information here is obtained by using the data processing method by the node that processes the service data, and the data processing method is shown in FIG. 1. For a specific processing method, references can be made to the previous recorded content. Details are omitted here for simplicity.

It is worthwhile to note that the formatted information here may alternatively be a digest obtained after an encryption operation is performed.

Step 202: The blockchain node determines, based on a transaction type corresponding to the transaction data and a predetermined relationship between the transaction type and a processing policy, a processing policy corresponding to the transaction data.

The processing policy includes a data attribute used for conversion and a conversion rule corresponding to the data attribute.

In the present implementation of the present application, a predetermined relationship between the transaction type and the processing policy may be preconfigured in each blockchain node in the blockchain network. The processing policy includes the data attribute used for conversion and the conversion rule corresponding to the data attribute.

For a specific implementation, references can be made to step 102 described in the previous implementation. Details are omitted here for simplicity.

When receiving the transaction data, the blockchain node may alternatively receive a predetermined relationship between the transaction type and the processing policy that is sent by a blockchain node that processes the transaction data.

Alternatively, when receiving the transaction data, the blockchain node receives a processing policy corresponding to the transaction data sent by the blockchain node that processes the transaction data.

Step 203: The blockchain node converts the formatted information into an attribute value based on the conversion rule included in the processing policy, and determines a data attribute corresponding to the attribute value.

In the present implementation of the present application, the blockchain node may perform inverse processing on received formatted information based on the conversion rule included in the processing policy, to obtain an attribute value, and the blockchain node further determines a data attribute corresponding to the attribute value. Here, the formatted information is restored by using the conversion rule. Because the same conversion method is used, accuracy of restoring the formatted information can be ensured.

Step 204: The blockchain node verifies received transaction data based on the attribute value of the data attribute and the attribute value of the data attribute included in the transaction data.

In the present implementation of the present application, if an attribute value obtained by the blockchain node through conversion is the same as the attribute value of the data attribute included in the transaction data, it indicates that the transaction data received by the blockchain node is reliable, and it is determined that the transaction data passes the verification; or if the attribute value obtained by the blockchain node through conversion is different from the attribute value of the data attribute included in the transaction data, it indicates that the transaction data received by the blockchain node is not true, and it is determined that the transaction data does not pass the verification.

Figure 3:
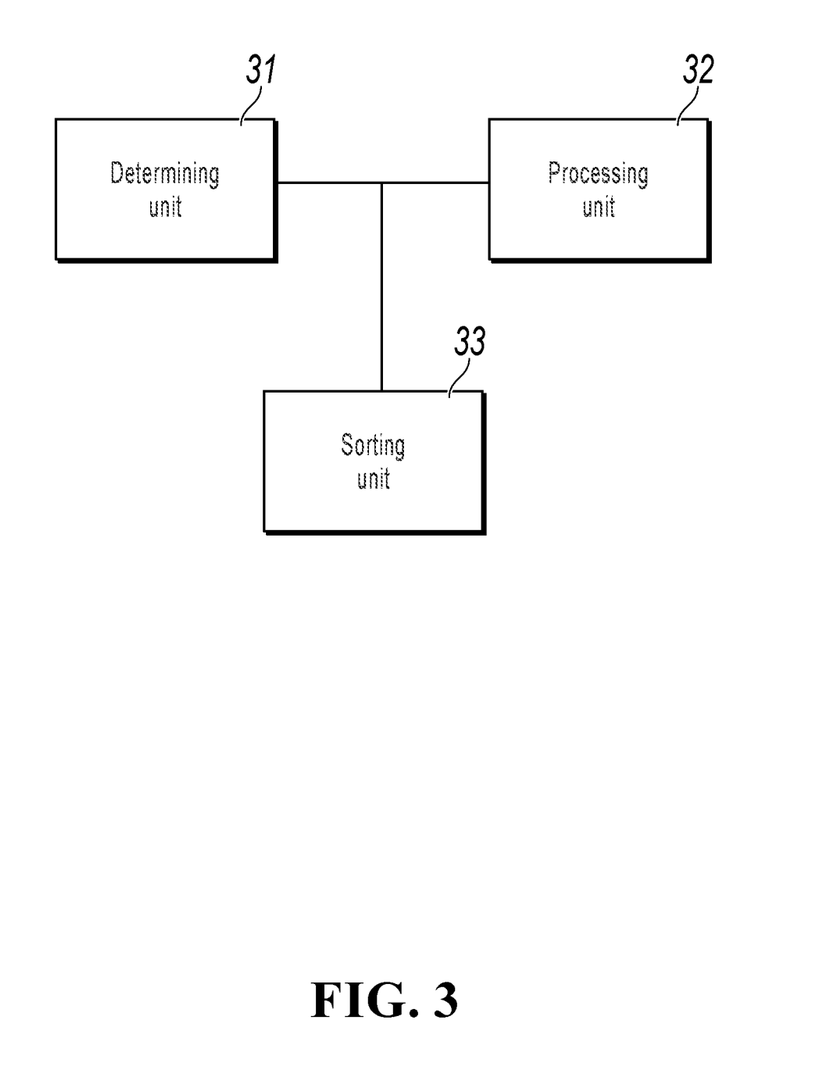
FIG. 3 is a schematic structural diagram illustrating a blockchain-based data processing device, according to an implementation of the present application.

FIG. 3 is a schematic structural diagram illustrating a blockchain-based data processing device, according to an implementation of the present application. The data processing device includes a determining unit 31 and a processing unit 32.

The determining unit 31 is configured to determine, for obtained transaction data, a transaction type corresponding to the transaction data.

The processing unit 32 is configured to: determine, based on a predetermined relationship between the transaction type and a processing policy, a processing policy corresponding to the transaction data, where the processing policy includes a data attribute used for conversion and a conversion rule corresponding to the data attribute; and extract, from the transaction data, an attribute value corresponding to the data attribute included in the processing policy, and convert the extracted attribute value into formatted information by using the conversion rule included in the processing policy; and process the transaction data based on the formatted information.

In another implementation of the present application, the data processing device further includes a sorting unit 33.

The sorting unit 33 is configured to: before the transaction data is processed based on the formatted information, in response to determining that more than one data attribute is included in the processing policy, after formatted information corresponding to each extracted attribute value is obtained, sort the obtained formatted information based on a sorting rule of the data attribute included in the processing policy.

In another implementation of the present application, that the processing unit 32 determines the predetermined relationship between the transaction type and the processing policy includes: performing the following operations for each transaction type: determining a transaction feature of the transaction type; selecting, from the transaction data of the transaction type, at least one data attribute that can represent the transaction feature; and generating, based on the selected at least one data attribute and a conversion rule configured for the data attribute, a processing policy corresponding to the transaction type, and establishing a mapping relationship between the transaction type and the processing policy.

In another implementation of the present application, that the processing unit 32 processes the transaction data based on the formatted information includes: broadcasting the formatted information and the transaction data, so that another blockchain node in a blockchain network performs consensus processing on the transaction data based on the formatted information.

In another implementation of the present application, that the processing unit 32 processes the transaction data based on the formatted information includes: encrypting the formatted information to obtain an encryption result, and sending the encryption result and the transaction data to another blockchain node in the blockchain network, to perform consensus processing on the transaction data.

In another implementation of the present application, that the processing unit 32 converts the extracted attribute value into formatted information based on the conversion rule included in the processing policy includes: performing an operation on the extracted attribute value based on a conversion algorithm included in the processing policy, to obtain a string corresponding to the attribute value.

It is worthwhile to note that the data processing device provided in the present implementation of the present application can be implemented by using software or hardware. Implementations are not limited here. The data processing device provided in the present implementation of the present application uses a unified conversion method to bring the following advantages: Different blockchain nodes can accurately restore converted information to original data, a difference between a digest obtained by a sender in an encryption process and a digest obtained by a receiver in a decryption process that is caused because of different operation platforms and/or compilation languages can be effectively avoided, consensus efficiency of the transaction data is effectively improved, and processing efficiency of the transaction data is improved.

Figure 4:
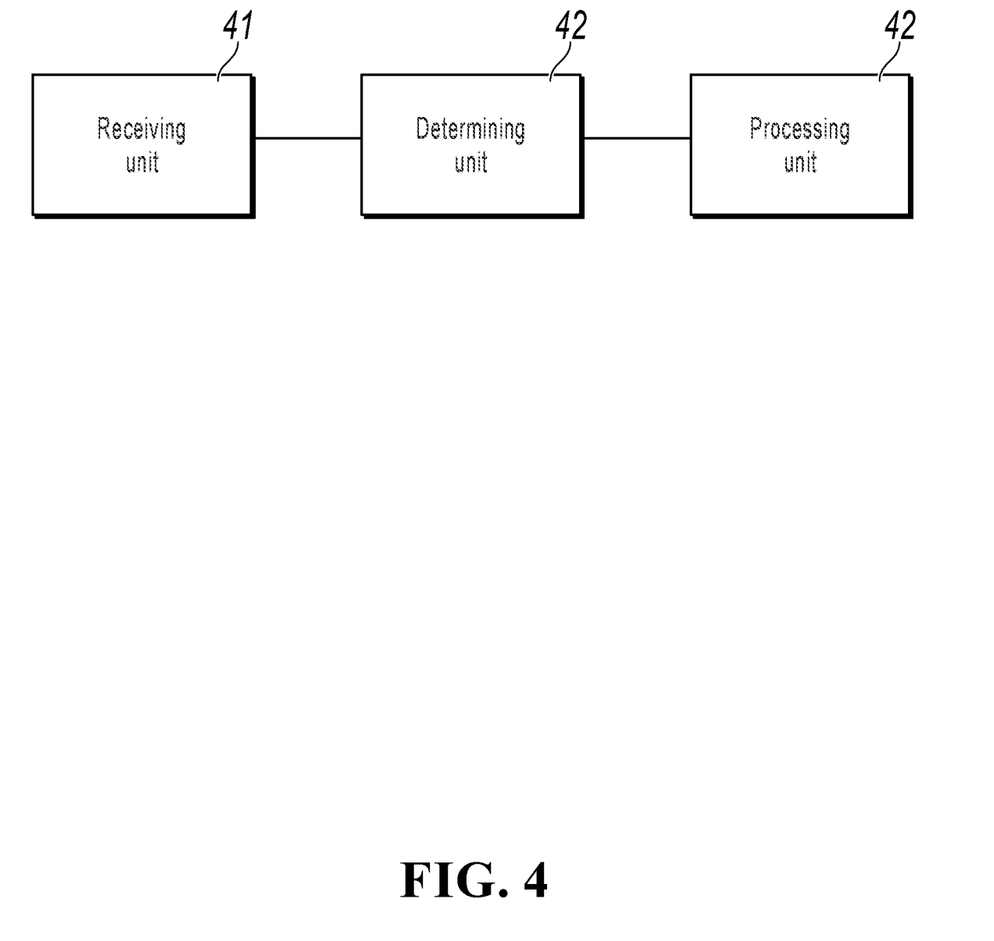
FIG. 4 is a schematic structural diagram illustrating a blockchain-based data processing device, according to an implementation of the present application.

FIG. 4 is a schematic structural diagram illustrating a blockchain-based data processing device, according to an implementation of the present application. The data processing device includes a receiving unit 41, a determining unit 42, and a processing unit 43.

The receiving unit 41 is configured to receive transaction data and formatted information corresponding to the transaction data.

The determining unit 42 is configured to determine, based on a transaction type corresponding to the transaction data and a predetermined relationship between the transaction type and a processing policy, a processing policy corresponding to the transaction data, where the processing policy includes a data attribute used for conversion and a conversion rule corresponding to the data attribute.

The processing unit 43 is configured to convert the formatted information into an attribute value based on the conversion rule included in the processing policy, and determine a data attribute corresponding to the attribute value; and verify received transaction data based on the attribute value of the data attribute and the attribute value of the data attribute included in the transaction data.

In another implementation of the present application, in response to receiving the transaction data, the receiving unit 41 receives a predetermined relationship between the transaction type and the processing policy that is sent by a blockchain node that processes the transaction data.

It is worthwhile to note that the data processing device provided in the present implementation of the present application can be implemented by using software or hardware. Implementations are not limited here. The data processing device provided in the present implementation of the present application uses a unified conversion method to bring the following advantages: Different blockchain nodes can accurately restore converted information to original data, a difference between a digest obtained by a sender in an encryption process and a digest obtained by a receiver in a decryption process that is caused because of different operation platforms and/or compilation languages can be effectively avoided, consensus efficiency of the transaction data is effectively improved, and processing efficiency of the transaction data is improved.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular compilation language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a calculating device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that the terms "include", "comprise", or their any other variants are intended to cover a non-exclusive inclusion, so a process, a method, a product or a device that includes a list of elements includes not only those elements, but also other elements which are not expressly listed, or further includes elements inherent to such a process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing blockchain-based data, the computer-implemented method comprising:

receiving, by a first blockchain node and from a second blockchain node, transaction data and encrypted binary formatted information corresponding to the transaction data, wherein the transaction data comprises a first attribute value corresponding to a data attribute, wherein the encrypted binary formatted information comprises serialization of the first attribute value by the second blockchain node, and wherein operating systems or compilation languages supported by the first blockchain node are different from operating systems or compilation languages supported by the second blockchain node;

decrypting, by the first blockchain node and using a public key associated with the second blockchain node, the encrypted binary formatted information to obtain binary formatted information corresponding to the transaction data;

determining, by the first blockchain node, a transaction type corresponding to the transaction data and a transaction feature from the transaction type;

selecting, from the transaction data, at least one data attribute that represents the transaction feature;

generating, based on the at least one data attribute and a conversion rule corresponding to the data attribute, a processing policy corresponding to the transaction data, wherein the processing policy comprises the at least one data attribute and the conversion rule corresponding to the data attribute;

converting, by the first blockchain node, the binary formatted information into a second attribute value based on the conversion rule;

determining, by the first blockchain node, the data attribute corresponding to the second attribute value; and in response to a determination that the first attribute value matches the second attribute value, determining, by the first blockchain node, that the transaction data passes a verification.

2. The computer-implemented method of claim 1, further comprising:

processing, by the first blockchain node, the transaction data based on the binary formatted information.

3. The computer-implemented method of claim 2, further comprising:
before processing, by the first blockchain node, the transaction data based on the binary formatted information:
determining whether the processing policy comprises more than one data attribute;
in response to determining the processing policy comprises more than one data attribute, obtaining formatted information corresponding to each extracted attribute value; and
sorting, by the first blockchain node, the formatted information based on a sorting rule of the data attribute.

4. The computer-implemented method of claim 2, wherein processing, by the first blockchain node, the transaction data based on the binary formatted information, comprises:
broadcasting, by the first blockchain node to a third blockchain node in a blockchain network, the binary formatted information and the transaction data, wherein the third blockchain node performs consensus processing on the transaction data based on the binary formatted information.

5. The computer-implemented method of claim 2, wherein processing, by the first blockchain node, the transaction data based on the binary formatted information comprises:
encrypting, by the first blockchain node, the binary formatted information to obtain an encryption result; and
sending the encryption result and the transaction data to another blockchain node in a blockchain network, to perform consensus processing on the transaction data.

6. The computer-implemented method of claim 1, further comprising:
performing, by the first blockchain node, an operation on the first attribute value based on a conversion algorithm, to obtain a string corresponding to the first attribute value.

7. The computer-implemented method of claim 1, further comprising, when the first blockchain node receives the transaction data:
receiving, by the first blockchain node, a predetermined relationship between the transaction type and the processing policy that is sent by a blockchain node that processes the transaction data.

8. The computer-implemented method of claim 1, wherein the binary formatted information is associated with a sorting sequence included in the processing policy.

9. A non-transitory, computer-readable medium storing one or more instructions executable by a computer system to perform operations comprising:
receiving, by a first blockchain node and from a second blockchain node, transaction data and encrypted binary formatted information corresponding to the transaction data, wherein the transaction data comprises a first attribute value corresponding to a data attribute, wherein the encrypted binary formatted information comprises serialization of the first attribute value by the second blockchain node, and wherein operating systems or compilation languages supported by the first blockchain node are different from operating systems or compilation languages supported by the second blockchain node;
decrypting, by the first blockchain node and using a public key associated with the second blockchain node, the encrypted binary formatted information to obtain binary formatted information corresponding to the transaction data;
determining, by the first blockchain node, a transaction type corresponding to the transaction data and a transaction feature from the transaction type;
selecting, from the transaction data, at least one data attribute that represents the transaction feature;
generating, based on the at least one data attribute and a conversion rule corresponding to the data attribute, a processing policy corresponding to the transaction data, wherein the processing policy comprises the at least one data attribute and the conversion rule corresponding to the data attribute;
converting, by the first blockchain node, the binary formatted information into a second attribute value based on the conversion rule;
determining, by the first blockchain node, the data attribute corresponding to the second attribute value; and
in response to a determination that the first attribute value matches the second attribute value, determining, by the first blockchain node, that the transaction data passes a verification.

10. The non-transitory, computer-readable medium of claim 9, further comprising:
processing, by the first blockchain node, the transaction data based on the binary formatted information.

11. The non-transitory, computer-readable medium of claim 10, further comprising:
before processing, by the first blockchain node, the transaction data based on the binary formatted information:
determining whether the processing policy comprises more than one data attribute;
in response to determining the processing policy comprises more than one data attribute, obtaining formatted information corresponding to each extracted attribute value; and
sorting, by the first blockchain node, the formatted information based on a sorting rule of the data attribute.

12. The non-transitory, computer-readable medium of claim 10, wherein processing, by the first blockchain node, the transaction data based on the binary formatted information, comprises:
broadcasting, by the first blockchain node to a third blockchain node in a blockchain network, the binary formatted information and the transaction data, wherein the third blockchain node performs consensus processing on the transaction data based on the binary formatted information.

13. The non-transitory, computer-readable medium of claim 10, wherein processing, by the first blockchain node, the transaction data based on the binary formatted information comprises:
encrypting, by the first blockchain node, the binary formatted information to obtain an encryption result; and
sending the encryption result and the transaction data to another blockchain node in a blockchain network, to perform consensus processing on the transaction data.

14. The non-transitory, computer-readable medium of claim 9, further comprising:
performing, by the first blockchain node, an operation on the first attribute value based on a conversion algorithm, to obtain a string corresponding to the first attribute value.

15. The non-transitory, computer-readable medium of claim 9, further comprising, when the first blockchain node receives the transaction data:
receiving, by the first blockchain node, a predetermined relationship between the transaction type and the processing policy that is sent by a blockchain node that processes the transaction data.

16. The non-transitory, computer-readable medium of claim 9, wherein the binary formatted information is associated with a sorting sequence included in the processing policy.

17. A computer-implemented system, comprising:
a plurality of computers; and
one or more computer memory devices interoperably coupled with the plurality of computers and having tangible, non-transitory, machine-readable media storing one or more instructions that, when executed by the plurality of computers, perform one or more operations comprising:
receiving, by a first blockchain node and from a second blockchain node, transaction data and encrypted binary formatted information corresponding to the transaction data, wherein the transaction data comprises a first attribute value corresponding to a data attribute, wherein the encrypted binary formatted information comprises serialization of the first attribute value by the second blockchain node, and wherein operating systems or compilation languages supported by the first blockchain node are different from operating systems or compilation languages supported by the second blockchain node;
decrypting, by the first blockchain node and using a public key associated with the second blockchain node, the encrypted binary formatted information to obtain binary formatted information corresponding to the transaction data;
determining, by the first blockchain node, a transaction type corresponding to the transaction data and a transaction feature from the transaction type;
selecting, from the transaction data, at least one data attribute that represents the transaction feature;
generating, based on the at least one data attribute and a conversion rule corresponding to the data attribute, a processing policy corresponding to the transaction data, wherein the processing policy comprises the at least one data attribute and the conversion rule corresponding to the data attribute;
converting, by the first blockchain node, the binary formatted information into a second attribute value based on the conversion rule;
determining, by the first blockchain node, the data attribute corresponding to the second attribute value; and
in response to a determination that the first attribute value matches the second attribute value, determining, by the first blockchain node, that the transaction data passes a verification.

18. The computer-implemented system of claim 17, including one or more operations comprising:
determining whether the processing policy comprises more than one data attribute;
in response to determining the processing policy comprises more than one data attribute, obtaining formatted information corresponding to each extracted attribute value;
sorting, by the first blockchain node, the formatted information based on a sorting rule of the data attribute to produce sorted information; and
processing, by the first blockchain node, the transaction data based on the sorted information.

19. The computer-implemented system of claim 17, including one or more operations comprising:
broadcasting, by the first blockchain node to a third blockchain node in a blockchain network, the binary formatted information and the transaction data, wherein the third blockchain node performs consensus processing on the transaction data based on the binary formatted information.

20. The computer-implemented system of claim 17, including one or more operations comprising:
performing, by the first blockchain node, an operation on the first attribute value based on a conversion algorithm, to obtain a string corresponding to the first attribute value.

21. The computer-implemented system of claim 17, including one or more operations comprising:
when the first blockchain node receives the transaction data, receiving, by the first blockchain node, a predetermined relationship between the transaction type and the processing policy that is sent by a blockchain node that processes the transaction data.

* * * * *